Oct. 11, 1927.
J. J. THACHER
1,645,123
BUSHING TURNING ATTACHMENT FOR AUTOMATIC LATHES
Filed Sept. 24, 1924    3 Sheets-Sheet 2
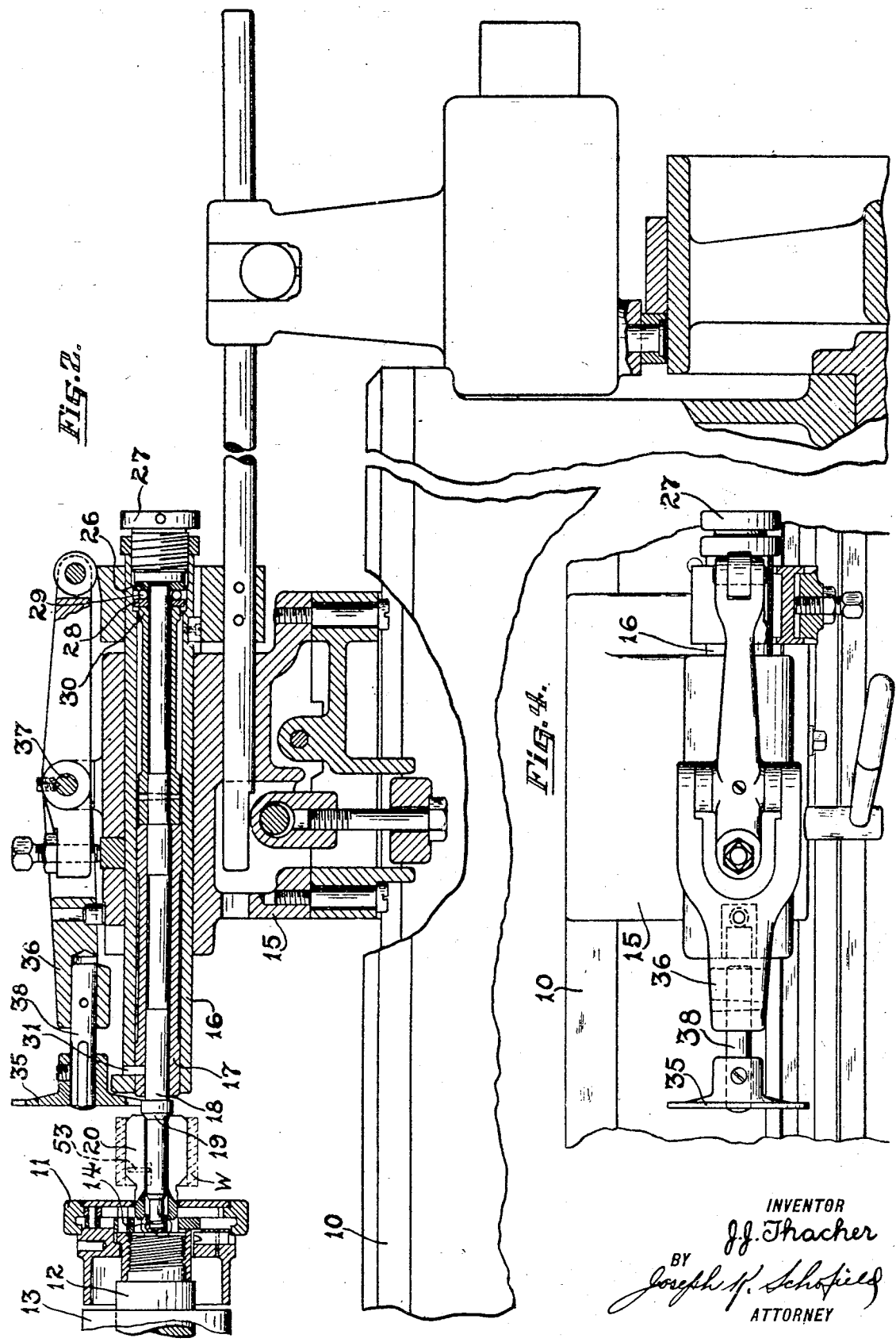

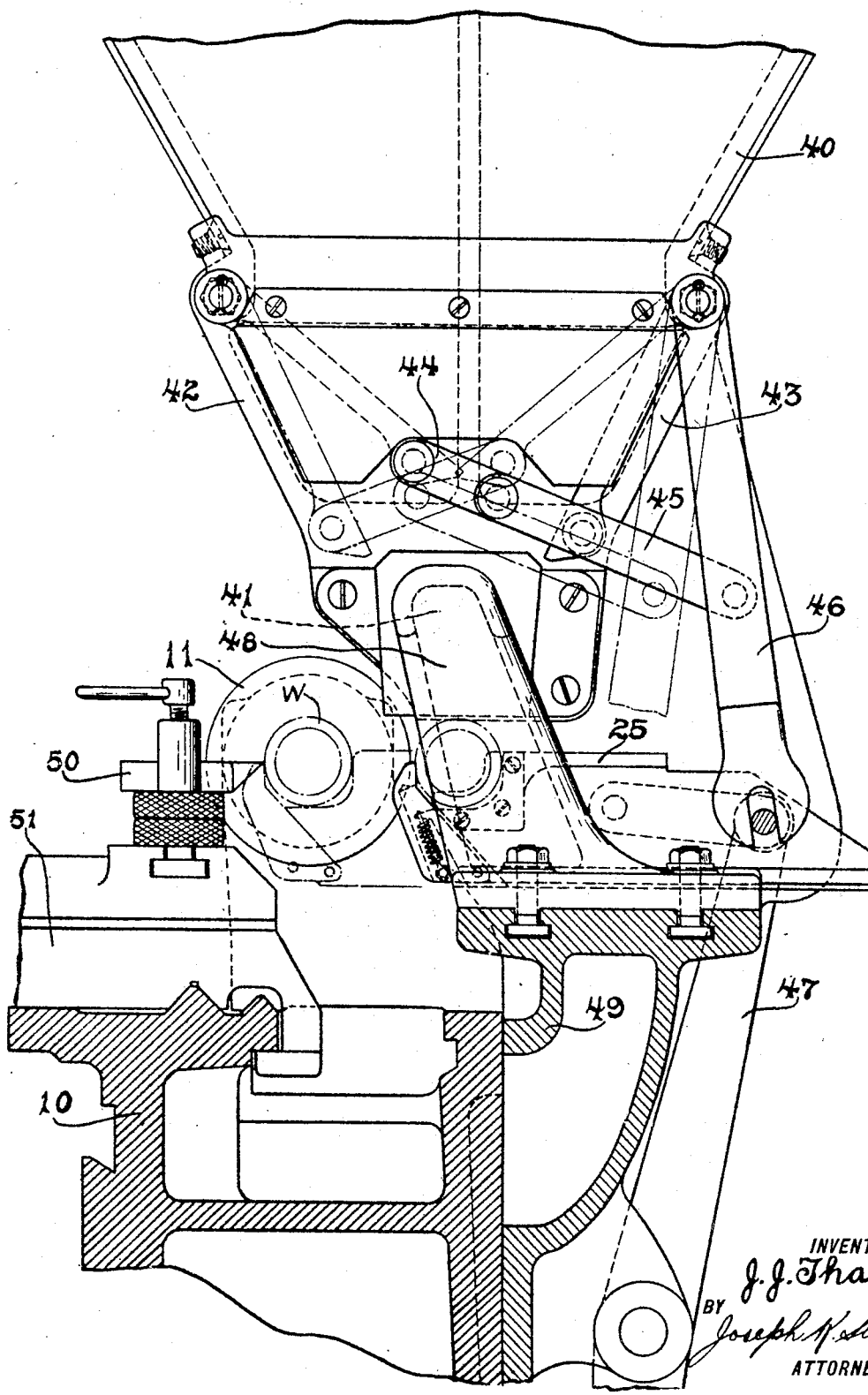

Oct. 11, 1927.  
J. J. THACHER  
1,645,123
BUSHING TURNING ATTACHMENT FOR AUTOMATIC LATHES
Filed Sept. 24, 1924    3 Sheets-Sheet 3
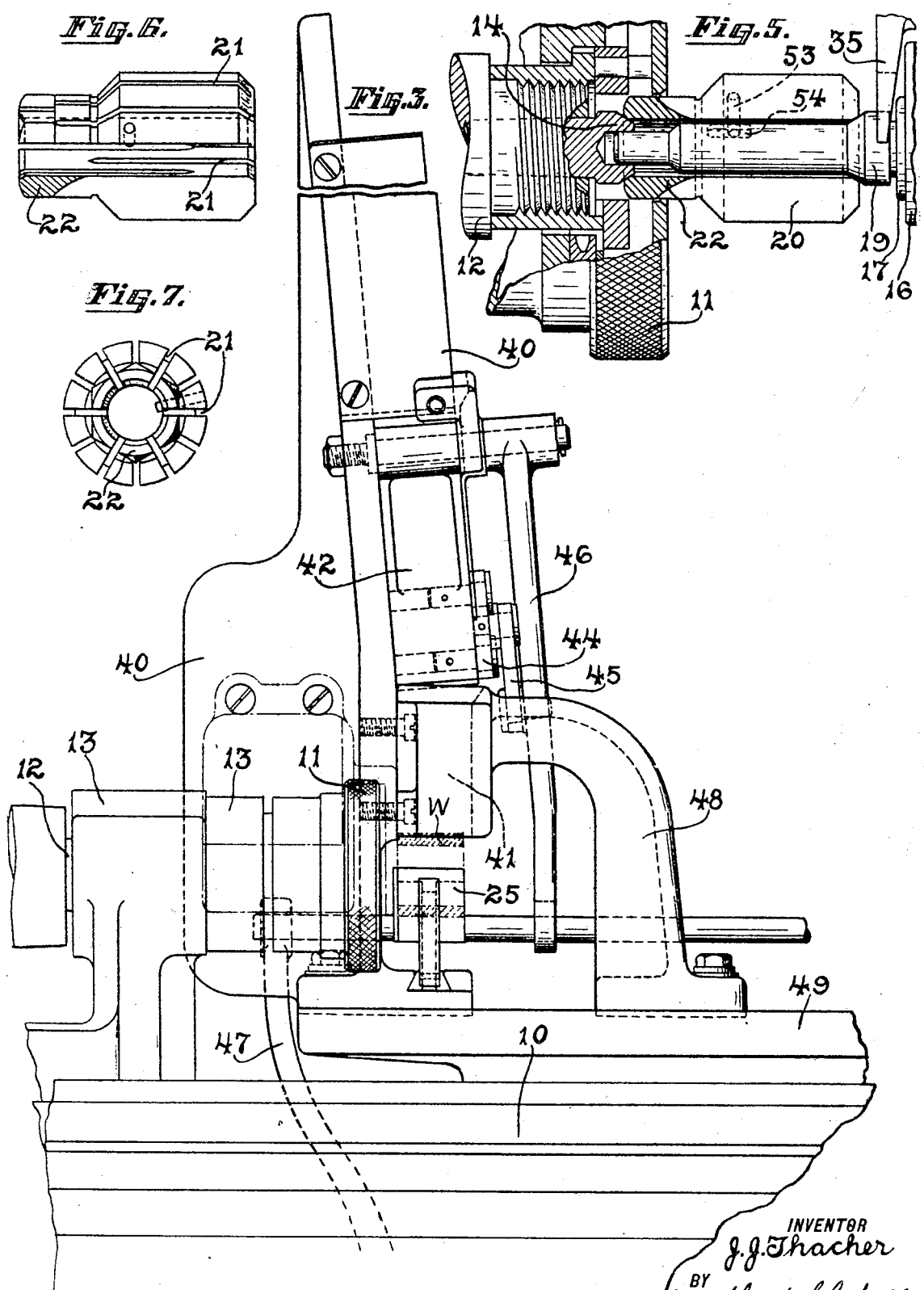

Patented Oct. 11, 1927.

1,645,123

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

BUSHING-TURNING ATTACHMENT FOR AUTOMATIC LATHES.

Application filed September 24, 1924. Serial No. 739,651.

This invention relates to an attachment for lathes of the automatic type adapted for turning bushings, or other short blanks, having a hole extending therethrough. More in particular, the invention relates to an attachment for the above purpose adapted to be attached to and form a part of an automatic lathe such as that shown in the patent to Müller 1,252,928, granted January 8, 1918.

An object of the present invention is to provide mechanism mounted on and forming part of an automatic lathe to expeditiously and automatically perform cutting operations upon bushings or other blanks having holes extending therethrough.

One feature which enables me to accomplish this object is that special means are provided, rotatably mounted upon a member movable with the tailstock spindle, and adapted to engage and drive the blank from an internal finished surface.

Another feature which is advantageous is that this member on which the blanks are mounted is provided with an extension adapted to be gripped when in its operative position by a chuck rotated by the headstock spindle of the automatic lathe.

Another principal object of the invention is to provide means for actuating this supporting and rotating means for the blanks in timed relation to the movements of the blank transferring means so that blanks may be automatically moved to operative position and then engaged by its driving means in position to be operated upon by the cutting tool which preferably may be of the form shown in the above mentioned patent.

A further object of the invention is to provide means for disengaging the blank from its supporting and rotating member by the retrograde movement of the tailstock spindle so that, as soon as a cutting operation upon a blank has been completed, the tailstock spindle may be retracted thus disengaging the blank and permitting a new blank to be engaged and rotated.

A still further object of the invention is to provide a hopper or magazine adapted to retain a large number of blanks to be operated upon and having movable members adapted to facilitate blanks being supplied to the blank transferring members, from which they may be advanced to be engaged by the rotating means.

With these and other objects in view, my invention consists in the features of construction and operation set forth in the following specification and illustrated in the accompanying drawings.

In the accompanying drawings annexed hereto and forming a part of this specification, I have shown my invention embodied in a special form of automatic lathe but it will be understood that the invention can be otherwise embodied and that the drawings are not to be construed as defining or limiting the scope of the invention, the claims appended to this specification being relied upon for that purpose.

In the drawings:

Figure 1 is a transverse view in elevation and partly in section showing the hopper and blank transferring means forming a part of this invention.

Fig. 2 is a vertical sectional view of the tailstock and supporting and rotating means for the blank, the hopper and transfer mechanism for the blanks being omitted.

Fig. 3 is a front elevation of the hopper, transfer mechanism and attached parts, the cutting tool and blank supporting means being omitted.

Fig. 4 is a fragmentary plan view of the tailstock showing the stripper member for disengaging the blanks from the supporting and rotating member.

Fig. 5 shows a detail view, upon an enlarged scale, of the blank supporting and rotating member, the chuck and a portion of the members mounted on the tailstock.

Fig. 6 is a longitudinal view, partly in section, of the blank supporting and rotating member, and Fig. 7 is a transverse view of the same.

In the above mentioned drawings, I have shown but one embodiment of the invention which is now deemed preferable, but it will be understood that changes and modifications may be made within the scope of the appended claims without departing from the spirit of the invention.

Briefly, and in its broadest aspect, my invention comprises the following principal parts: first, an automatic lathe of the type shown in the above mentioned patent of Müller provided with a specially equipped tailstock spindle carrying a member upon which the blank is mounted for rotation, means to automatically actuate said spindle to engage a blank upon the supporting member, a chuck to engage and rotate the member while in its operative position, a special hopper or magazine for the blanks being operated upon, transfer means for moving the blanks from the magazine to operative position to be engaged by the cutting tool, an automatically actuated cutting tool, and means to disengage the blank from its supporting member after the cutting operation.

Referring more in detail to the figures of the drawings, the automatic lathe having a base 10 is provided with the usual type of floating chuck 11 adapted to be mounted upon and rotate with the headstock spindle 12. The headstock spindle 12 within the headstock 13 is adapted to be rotated by any convenient means as a pulley. This headstock spindle 12, within the chuck 11, is provided with an internal center 14 axially aligned with the spindle 12 and is adapted to function in a manner which presently will be described. The tailstock 15, which preferably is of the type shown in the patent referred to above, has automatic means for advancing and retracting its spindle 16 into and out of operative position and also is provided with means for clamping it in its operative or advanced position. This tailstock spindle 16 is provided with a sleeve 17 extending axially therein, a rod 18 being mounted within this sleeve 17 in a manner permitting it to be rotated. On the forward end of this rod 18 is a conical portion 19 adapted to be engaged by portions of the blank mounting and rotating member 20 whereby the segments of this member are expanded to firmly engage the blank W.

This blank rotating member 20 is of special form and is adapted, as shown in Figs. 2 and 5, to engage an internal finished surface of the blank W. This support for the blank W comprises a member 20 having a cylindrical outside surface adapted to fit the internal surface of the blank W so that it will be gripped firmly. This member 20 is cut into segments by slots 21 extending from opposite ends of the member almost entirely through the member so that it may be expanded radially resiliently to engage the blank. At the forward end of this work driving member 20 is a reduced cylindrical portion 22 adapted to engage the jaws of the chuck 11 mounted on the headstock spindle 12 so that it may be positively rotated.

In order to expand the member 20 to engage the blank W firmly enough to rotate it during operation, the opposite ends of a hole extending through the member 20 are countersunk as shown clearly in Fig. 6. These countersunk portions of the blank supporting member 20 are adapted to be engaged by corresponding conical portions on the rod 18 and center 14 so that upon movement of the tailstock spindle 16 into its advanced position the segments 21 of the supporting member 20 will be uniformly separated to firmly engage the blank being operated upon. One of these conical portions is formed directly on the rod 18 extending through the tailstock spindle 16. The other conical portion is formed on the outside surface of the center 14 on the headstock spindle 12. It will be seen therefore that by movement of the tailstock spindle 16 to its advanced position, which movement takes place to mount a blank in operative position, a blank W is supported on and drivingly connected to the supporting member 20.

In the operation of this member 20, movement of the tailstock spindle 16 to its operative position first engages the blank W from a transfer member 25 which is moved to its advanced position. Continued movement of the tailstock spindle 16 forces the conical portion on the rod 18 and that on the center 14 against the chamfered or countersunk portions of the driving member 20 so that the segments 21 are slightly expanded throughout their length to grip the internal surface of the blank W. As this pressure of the rod 18 toward the advanced position is depended upon to drive the work W and must be maintained during operation, a special thrust bearing is provided within the tailstock spindle 16 to take this thrust. This bearing comprises one annular member 26 mounted on the forward end of a member 27 threaded into the rear end of the spindle 16. A corresponding annular member 28 spaced from the first member 26 so that the balls 29 may be placed therebetween is mounted on a sleeve 30 keyed or otherwise fastened to the rod 18. From this construction, it will be seen that the rod 18 within the tailstock spindle 16 and the sleeve 30 is rotatable within the spindle 16. The sleeve 17 in alignment with the sleeve 30, as shown in Fig. 2, is maintained against rotation within the spindle by means of a suitable pin 31 passing through the spindle 16 and forms a bearing for the rod 18 adjacent the blank supporting member 20.

In order to disengage the blank W from its supporting and rotating member 20 when the cutting operation thereon has been completed, a stripper or abutment 35 is mounted so that the retracting movement of the tailstock spindle 16 will cause this abutment to be engaged by the blank W and thus the driving member 20 will be removed therefrom. One stripper 35 for the blank shown as being operated upon is clearly disclosed in its operative position in Figs. 2 and 4. On the upper portion of the tailstock 15 and preferably upon an arm 36 pivotally mounted on a transverse stud or shaft 37 is a bar 38 inserted in the forward end of the arm 36. On this bar 38 is retained the flange 35 having its periphery notched as shown to permit the blank driving member 20 to be retracted but adapted to engage one end surface of the blank W so that the blank will be removed from its driving member as the tailstock spindle 16 is retracted.

As the present invention is adapted to operate entirely automatically, a special holder in the form of a hopper or magazine 40 is provided in which a plurality of blanks W may be placed. These, by gravity, are retained in the lower portion of the hopper and enter singly a small chute 41 provided at the lower end of the hopper 40 from which the blanks may be engaged by the transfer member 25 above mentioned while in retracted position and moved to alignment with the headstock and tailstock spindles 13 and 16. The particular hopper 40 adapted for this machine is shown clearly in Figs. 1 and 3 but it will be understood that for different types of blanks, the magazine or hopper may be suitably modified. As shown in Figs. 1 and 3, the lower portions of the hopper are provided with lateral walls 42 and 43 pivotally mounted so that they may be actuated to suitably move about or agitate the blanks W to prevent their becoming blocked in the hopper 40 and thus permitting them to be fed freely into the chute 41 from which they are engaged by the transfer member 25. These end walls 42 and 43 respectively at the front and rear of the hopper 40 are connected to each other at their lower ends by means of a suitable link 44. At an intermediate point of this link 44 is pivoted an arm 45 attached at its opposite end to an actuating member 46 conveniently mounted upon the hopper. The lower end of this actuating arm 46 is forked and engages a member or lever 47 moving with the blank transfer actuating mechanism. From this construction, it will be seen that with each movement of the transfer member 25 to advanced and retracted position when a blank is being mounted in operative position and the transfer member returned, the actuating arm 46 is also oscillated which in turn moves the link 45 to swing the end walls 42 and 43 of the magazine 40 back and forth thus moving the blanks about within the hopper 40 and facilitating their entering the chute 41. Just below the lowermost ends of these arms the chute, referred to above, is preferably located, and which is formed by a supplemental member in the form of a bracket 48 bolted to the hopper 40 at its upper end of suitable dimensions for the blanks to be allowed to fall individually. By suitable screws, the bracket 48 may be fastened to the support 49 for the transfer mechanism. It will be seen therefore that one or more of the blanks W will always be within this chute 41 and ready to drop into position upon the transfer member 25 when this member is in its retracted position.

A cutting tool 50 adapted to engage the outer cylindrical surface of the bushing forming the blank W is provided of the form and adapted to be actuated by means similar to those shown in the patent to Müller. It will be understood however that this tool 50 may take any form and may be operatively mounted upon a taper bar or other mechanism on the tool carriage 51 shown in the above mentioned patent so that it may be removable toward or from the axis of the work during its longitudinal movement. Mechanism for actuating this tool carriage 51 longitudinally may be of the form exactly as shown in the patent above mentioned whereby it is fed along the work and when the blank has been released and while another one is being engaged, the tool is retracted to its initial position. Also the means for actuating the tailstock spindle 16, opening and closing the chuck 11 and advancing and retracting the blank transferring means 25 may all be actuated in timed relation to each other by a mechanism in every way similar to that shown in the patent above mentioned.

Retained within the blank supporting and rotating member 20 is a pin 53 entering the rod 19. Preferably an elongated slot 54 is provided in rod 19 into which the pin 53 may enter thus permitting the body member to move longitudinally on the rod 19 a limited distance. The primary function of the pin 53 is to retain the supporting member 20 in position on the rod 19 when the work blank W is being stripped from the member 20. By means of the slot 54 in the rod 19, a slight movement axially of the body member 20 is possible, thus permitting the rod 19 to enter the supporting member far enough to engage the countersunk portions of the body member with the tapered portion on the rod.

What I claim is:

1. Work blank supporting means for automatic lathes comprising in combination, a tailstock, a spindle therein, means to actuate said spindle, a member rotatably mounted on said spindle, means to expand said member uniformly along its length when the spindle is moved into operative position whereby said member will engage the work blank, and means to rotate said member and work blank.

2. Work blank supporting means for automatic lathes comprising in combination, a headstock, a spindle therein, a tailstock, a spindle therein, means to actuate said tailstock spindle and rotate said headstock spindle, a member rotatably mounted on said tailstock spindle, tapered portions carried by said spindles to expand said member uniformly along its length when the tailstock spindle is moved into operative position whereby said member will engage the work blank, and means to rotate said member and work blank.

3. Work blank supporting means for automatic lathes comprising in combination, a tailstock, a spindle therein, means to actuate said spindle toward and from operative position, a member rotatably mounted on said spindle, means to expand said member when the spindle is moved into operative position, and means engaging said member to rotate the work blank when the member is moved to its operative position.

4. Work blank supporting means for automatic lathes comprising in combination, a tailstock, a spindle therein, means to actuate said spindle, a member rotatably mounted on said spindle and movable therewith, means to expand said member uniformly along its length when the spindle is moved into operative position whereby the member will engage the work blank, means to rotate said member and work blank, and means to disengage the blank from the supporting member when said tailstock is moved to its inoperative position.

5. Work blank supporting means for automatic lathes comprising in combination, a headstock, a spindle therein, a tailstock, a spindle therein, means to actuate said tailstock spindle and rotate said headstock spindle, a member rotatably mounted on said tailstock spindle and adapted to engage the blank upon an internal surface, means to rotate said member when in operative position, means to expand said member uniformly along its length when the spindle is moved into operative position whereby said member will engage the work blank, said blank being released from said member upon movement of the spindle in the opposite direction.

6. Work blank supporting and rotating means for automatic lathes, comprising in combination, a tailstock, a spindle therein, means to actuate said spindle, a member rotatably mounted on said spindle, means to expand said member when the spindle is moved into operative position, and means to rotate said member when in its operative position.

7. Work blank supporting and rotating means for automatic lathes, comprising in combination, a tailstock, a spindle therein, means to actuate said spindle, a member rotatably mounted on said spindle and adapted to engage the blank, means to expand said member to grip the blank when the spindle is moved into operative position, means to support the free end of said member, and means to rotate said member when in its operative position.

8. Work blank supporting and rotating means for automatic lathes, comprising in combination, a tailstock, a spindle therein, means to actuate said spindle, a member rotatably mounted on said spindle and adapted to engage the blank, means to expand said member to grip the blank when the spindle is moved into operative position, means to rotate said member when in its operative position, and means to disengage the blank when the member is moved to its inoperative position.

9. Work blank supporting and rotating means for automatic lathes, comprising in combination, a tailstock, a spindle therein, means to actuate said spindle to move the supporting member into and out of operative position, a member rotatably mounted on said spindle, means to expand said member to grip the blank when the spindle is moved into operative position, means to rotate said member when in its operative position, and means to disengage the blank from the member when the member is moved to its inoperative position.

10. Work blank supporting and rotating means for automatic lathes, comprising in combination, a tailstock, a spindle therein, means to actuate said spindle, a member rotatably mounted on said spindle, tapered means to expand said member when the spindle is moved into operative position, means to rotate said member when in its operative position, and means to discontinue rotation when the spindle is moved to inoperative position.

11. Work blank supporting means for automatic lathes, comprising in combination, a tailstock, a spindle therein, means to actuate said spindle, a member rotatably mounted on said spindle, supporting means for said member at its free end, means contacting with said member at its opposite ends for expanding it to grip the blank, and means to rotate said member when in its operative position.

12. Work blank supporting means for automatic lathes, comprising in combination, a tailstock, a spindle therein, means to actuate said spindle, a member rotatably mounted on said spindle, taper recessed portions on said member adapted to be engaged by expanding means when in its operative position whereby the blank on the member is gripped and rotated, said expanding means being disengaged when the spindle is moved to inoperative position, and means to disengage the blank from the member on movement of the spindle to inoperative position.

13. An automatically acting metal cutting machine comprising in combination, a base, a blank carrying hopper, a transfer member, means to actuate said member to advance a blank from said hopper to operative position, a tailstock, a spindle therein, means automatically actuating said tailstock spindle, a blank supporting member mounted on and movable with said tailstock spindle, means to rotate said member and its blank, a cutting tool, and means to move said cutting tool along said blank.

14. An automatically acting metal cutting machine comprising in combination, a base, a blank carrying hopper, a transfer member, means to actuate said member to advance a blank from said hopper to operative position, a tailstock, a spindle therein, means automatically actuating said tailstock spindle, a blank supporting member mounted on and movable with said tailstock spindle, means to rotate said member and its blank, a cutting tool, and means to move said cutting tool along said blank, each of said means being operated in predetermined timed relation to each other.

15. An automatically acting metal cutting machine comprising in combination, a base, a blank carrying hopper, a transfer member, means to actuate said member to advance a blank from said hopper to operative position, a tailstock, a spindle therein, means automatically actuating said tailstock spindle, a blank supporting member mounted on and movable with said tailstock spindle, means to expand said supporting member to grip the blank upon an internal surface, means to rotate said member and its blank, a cutting tool, and means to move said cutting tool along said blank.

16. An automatically acting metal cutting machine comprising in combination, a base, a blank carrying hopper, a transfer member, means to actuate said member to advance a blank from said hopper to operative position, a tailstock, a spindle therein, means automatically actuating said tailstock spindle, a blank supporting member mounted on and movable with said tailstock spindle, means to rotate said member and its blank, a cutting tool, means to move said cutting tool along said blank, and means to disengage the blank from its supporting member at the conclusion of operation of the tool.

17. An automatically acting metal cutting machine comprising in combination, a base, a blank carrying hopper, a transfer member, means to actuate said member to advance a blank from said hopper to operative position, a tailstock, a spindle therein, means automatically actuating said tailstock spindle, a blank supporting member rotatably mounted on and movable with said tailstock spindle, means to expand said member whereby it will grip and rotate its blank when the spindle is moved to its operative position, a cutting tool, and means to move said cutting tool along said blank.

In testimony whereof, I hereto affix my signature.

JOHN J. THACHER.